United States Patent

[11] 3,547,474

[72] Inventors John B. Colletti
Grosse Point Park;
Peter James Dumeah, Royal Oak, Mich.
[21] Appl. No. 841,850
[22] Filed July 15, 1969
[45] Patented Dec. 15, 1970
[73] Assignee TRW Inc.
Cleveland, Ohio
a corporation of Ohio

[54] BOOT SEAL
5 Claims, 5 Drawing Figs.
[52] U.S. Cl. .................................................. 287/87, 277/212
[51] Int. Cl. ..................................................... F16c 11/06
[50] Field of Search........................................... 287/87, 90A, 90C, 88; 277/212FB, 189, 183

[56] References Cited
UNITED STATES PATENTS
2,308,613  1/1943  LeTourneau................  287/88
3,215,364  3/1964  Springer.......................  287/90A
3,371,937  3/1968  Osamu Maeda..............  277/189
FOREIGN PATENTS
494,650  10/1938  Great Britain................  287/90C
597,641  1/1948  Great Britain................  287/90C Primary Examiner—Kenneth Downey
Assistant Examiner—Andrew V. Kundrat
Attorneys—Hill and Hill, and Hill, Sherman, Meroni, Gross & Simpson ABSTRACT: A boot seal and retainer for movable stud joints of the type which have a pivotable end stud projecting from a housing through an open throat, the boot seal serving to seal the open throat of the housing. The retainer comprises a stamped ring having an axially extending portion terminating in a radially outwardly directed flange through an intermediate shoulder. The axially extending portion is adapted to be press-fitted into the open throat of the housing up to the depth of the intermediate shoulder with the radially outwardly directed flange seated in an internal groove in the boot seal thereby allowing the housing and seal to be preassembled and shipped as a unit. The seal, when assembled, has an outer diameter less than the outer diameter of the joint housing.

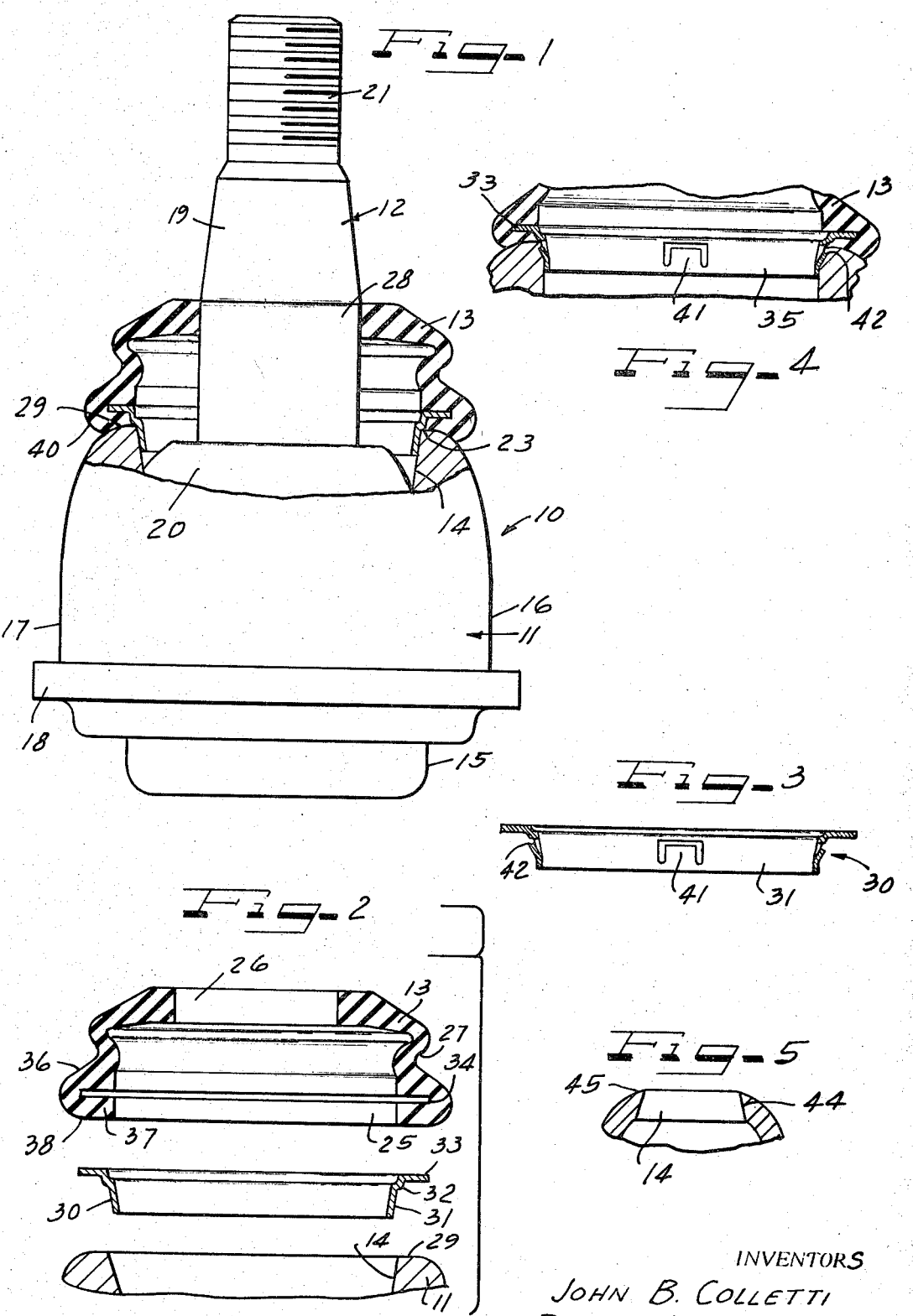

BOOT SEAL

BACKGROUND OF THE INVENTION

1. Field of the Invention

This invention relates to joints and more particularly to boot seals for movable stud joints.

2. Prior Art

Movable stud joints are used extensively as couplings between two dependently movable parts and especially in vehicular steering linkages. Such joints usually include a housing having a cup-shaped interior with a restricted opening or throat. A ball-ended stud is received in the housing, usually encompassed by a bearing. The stud projects from the ball end through the throat to the exterior. The housing is attached to one of the movable members while the stud is attached to the other member. Because the ball may move within the housing in both a rotating and tilting fashion while the stud remains attached to the housing relative rotating and tilting movement between the two members is allowed at the joint while major movement of the members is dependent upon one another.

In order to increase the effectiveness and life of the joint, it is desirable to keep dirt from entering through the restricted throat of the housing into the ball filled cavity. Further, in order to minimize wear, it is oftentimes desirable to retain grease within the housing to lubricate the ball end of the stud. For these purposes it is known in the art to provide a diaphragm-type boot seal having a large opening at one end encompassing and sealed to the housing and a smaller opening at the other end encircling and sealing against a circumferential portion of the stud. Due to the corrugated or diaphragm construction of such boot seals or due to the resiliency of their material, they do not interfere with the movement of the stud and are generally effective in retaining grease while preventing entrance of foreign matter into the housing.

One specific type of movable stud joint has a constant diameter portion of the housing adjacent an increased-diameter portion remote from the point of projection of the stud. This type of housing is adapted to be press-fitted through an opening in one of the members to be joined. The increased-diameter portion then abuts the member on one side thereof while the stud projects from the other side.

The prior art boot seals were generally adapted to be received around the external circumference of the joint housing and be retained there in some manner such as by engagement with housing carried protrusions. Such prior art boot seals normally have a diameter greater than the diameter of the housing. Thus, they were of larger diameter than the portion of the housing to be press-fit through the opening in the coupling member. This required that the seal be attached to the housing after the housing was press-fitted through the female opening of the adjoining member, resulting in additional assembly steps and preventing the joint from being shipped and assembled as a single unit with the boot seal already in place. This allows entry of dirt and other foreign matter. It also allows escape of grease or other lubricants during storage and shipment of the joint prior to final assembly.

SUMMARY OF THE INVENTION

The present invention overcomes the disadvantages of the prior art by providing a boot seal having an external diameter, when assembled to the joint, less than the external diameter of the joint in the area adapted to be press-fit into the cooperating female member.

The boot seal consists, in a preferred embodiment, of an elastomeric bellows member having a large-diameter opening at one end and a small-diameter opening at the other. An internal groove is provided adjacent the large-diameter opening. The internal diameter of the large-diameter opening is approximately the same as the internal diameter of the throat of the housing. A metallic or other rigid material ring member is provided for attaching the seal to the housing. The ring member has a cylindrical or slightly frustoconical portion which terminates in a radially outwardly directed shoulder portion which in turn is integral with an axially extending portion which integrally terminates in a radially outwardly directed flange. The outwardly directed flange is dimensioned to be received within the groove in the inner diameter of the boot seal while the cylindrical or frustoconical portion is adapted to be press-fit into the restricted throat opening of the housing. In the preferred embodiment, the radially outwardly directed shoulder portion of the ring acts as a spacing member by abutment with the exterior surface of the housing.

In a modified form of the invention, outwardly projecting spring-like fingers are provided around the circumference of the cylindrical portion of the ring to increase the frictional grab of the ring against the inner diameter of the throat.

It is therefore an object of this invention to provide a new and improved boot seal for movable stud joints.

It is a further object of this invention to provide a boot seal for movable stud joints which, when attached to the housing of the joint, has an external diameter less than the external diameter of the joint.

It is a further object of this invention to provide a movable stud joint of the type which is press-fitted through an opening in a member to be joined and which has an attached boot seal dimensioned with an external diameter less than the external diameter of the housing thereby allowing the joint housing to be attached to the member to be joined with the boot seal in place.

It is yet another and more specific object of this invention to provide a method of attaching a boot seal to a movable stud joint housing by press-fit relationship with the inner diameter of the restricted throat opening of the housing.

It is yet another and more specific object of this invention to provide a bellows-type boot seal having a large-diameter opening at one end thereof, an annular fasting ring attached to the inner diameter of the opening and having an axially projecting annular portion adapted to be press-fit into the throat of a movable stud joint to attach the boot seal thereto.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a view partially in section of a movable stud joint equipped with the boot seal of this invention;

FIG. 2 is a fragmentary cross-sectional exploded view of the joint and boot seal of FIG. 1;

FIG. 3 is a cross-sectional view of a modified form of the attaching ring of this invention;

FIG. 4 is a fragmentary cross-sectional view of the modified ring of FIG. 3 installed in the throat of a housing;

FIG. 5 is a fragmentary cross-sectional view of a modified housing throat opening.

DESCRIPTION OF THE PREFERRED EMBODIMENTS

FIG. 1 illustrates a movable stud joint 10 which comprises a housing 11, a stud 12 and a seal 13. The housing 11 is cup-shaped having a throat or opening 14 at the bottom thereof and a closure 15 closing the top. The outer diameter 16 of the housing has a constant diameter axial portion 17 which terminates in an increased diameter flange 18 adjacent the top 15.

The housing 11 is adapted to be received through a female opening in a member to be joined (not shown). The opening in the member has a diameter equal to or slightly less than the constant diameter portion 17. Thus, insertion of the joint bottom first through the opening will result in a press-fit connection with the member abutting the flange 18.

The stud consists of a shaft portion 19 terminating in a ball-ended portion 20 which is seated in the housing 11. The shaft 19 projects through the throat 14 and has a threaded end 21 remote from the ball end 20 which is adapted to be attached to the other member to be coupled by the joint.

The throat 14 to the housing through which the stud projects has a diameter greater than the diameter of the stud so as to allow relative tilting movement between the stud and the housing 11. In the embodiment illustrated in FIG. 1, the throat 14 has an inwardly tapering frustoconical configuration which mates with the outer surface of the bottom of the housing at a sharp angle 23.

In order to prevent entry of dirt into the interior of the housing where it may abrade the moving surfaces between the ball and the inner diameter of the housing or between the ball and a bearing material block against which the ball may ride, a seal 13 is utilized to close the throat 14.

As illustrated in FIG 2, the seal 13 is of the tube bellows type having a large diameter opening 25 in one end thereof and a small diameter opening 26 in the opposite end. The seal is corrugated through a reverse bend circumferential corrugation 27 and is constructed of a resilient material to provide the bellows-like action. The diameter of the small-diameter end 26 is substantially the same or smaller than the diameter of the cylindrical portion 28 of the stud shank 19 and is adapted to sealingly encircle the stud. The large diameter end 25 of the seal has a diameter substantially equal to the diameter of the throat 14 at the bend or shoulder 23 and is adapted to sealingly engage the outside surface 29 of the housing 11 at the bottom thereof.

Due to the bellows corrugation of the seal, it can follow and accommodate tilting movement of the stud with respect to the housing without disengagement from either the housing or the stud.

An attachment ring 30 is utilized to attach the seal 13 to the housing 11. The ring is annular and has a substantially cylindrical axially extending portion 31 which is integral through a ledge 32 with a radially outwardly extending flange 33. The shoulder 32 is a radially outwardly extending shoulder. The flange 33 is adapted to be received in a groove 34 in the inner diameter of the boot seal 13 adjacent and spaced from the end 25. It is to be noted that the portion 36 of the boot seal 13 adjacent the end 25 is radially thicker than the area of the seal in the reverse curve 27. This provides a relatively radially thick axial portion 37 between the groove 34 and the end 38 of the seal which mates with the surface 29 of the housing.

With the flange 33 received in the groove 34, the retaining ring 30 is then press-fitted into the throat 14 of the housing. The portion 31 of the ring preferably has a diameter equal to or slightly greater than the diameter of the throat 14 and has an angle which is matable therewith. In the FIG. 2 embodiment, the throat 14 is illustrated as being tapered frustoconically inward into the housing. Thus, the substantially cylindrical portion 31 has a slightly frustoconical taper to mate with the throat 14. The shoulder 32 functions as a spacer and the ring 30 is adapted to be pressed into the housing to a point of abutment with the shoulder. When so assembled, as illustrated in FIG. 1, the surface 38 of the boot seal will be pressed into sealing contact with the surface 29 of the housing and the portion 37 will be compressed and flow slightly outwardly forming a circumferential bulge 40.

Because the boot seal is attached to the housing at the throat, it can be dimensioned to have an external diameter when assembled which is less than the external diameter of the portion 17 of the housing adjacent the increased diameter flange portion 18. Thus, the seal is retained on the housing without interfering with the ability of the joint assembly to be press-fit through an opening in one of the members to be joined.

In order to increase the frictional holding ability of the press-fit mate between the throat 14 and the portion 31 of the ring, in a modified form of the invention illustrated in FIG. 3, spring-like metal fingers 41 are struck from the portion 31 of the ring 30. The fingers 41 project radially outwardly from the portion 31 and are circumferentially spaced from each other.

The fingers are struck so as to be integral along their bottoms and therefore capable of radial compression during insertion of the ring into the throat. Thereafter, due to their spring-like action, they will press outwardly against the throat increasing the frictional contact.

Further, the top edges 42 of the spring fingers may have relatively sharp corners thereon so that attempting to withdraw the ring from the throat will cause the fingers to bite into the metal of the housing as illustrated in FIG. 4. This will result in a firmer grip of the ring to the housing.

It is not necessary that the throat 14 have a frustoconically inwardly sloping surface. The throat may either be cylindrical or be outwardly tapered as illustrated in FIG. 5. In cases where the throat is cylindrical, the portion 31 of the ring may be cylindrical. In those instances where the throat tapers radially outwardly as the taper 44 in FIG. 5, the portion 31 of the ring may also be cylindrical. In this modification, the spring fingers 41 will be compressed as they are forced past the outer open end 45 of the throat 14 and thereafter will spring outward as the throat increases in diameter, providing more positive retainment.

It can therefore be seen that our invention provides for a boot seal which is attached to a movable stud joint housing at the throat opening of the stud by means of a retaining ring which is attached at one end to the boot seal and which has the other end thereof press-fitted into the throat. The seal has a diameter less than the mating face diameter of the housing so that the entirety of the assembly may be preassembled and then press-fitted into a receiving opening in a member to be coupled by the joint.

Although the teachings of my invention have herein been discussed with reference to specific theories and embodiments, it is to be understood that these are by way of illustration only and that others may wish to utilize my invention in different designs or applications.

We claim:

1. A movable stud joint comprising: a housing having a throat opening in one end, a ball ended stud received in said housing with the shank thereof projecting through said throat opening, a boot seal comprising a substantially tubular members, said member having one end dimensioned to encirclingly sealingly engage the outer diameter of the stud, the other end of said member sealingly engaging the outer end surface of the said housing adjacent the said throat, an inner peripheral groove in said tubular member adjacent the said other end, a retaining ring, said ring having a substantially axially extending portion and a substantially radially outwardly extending portion, said radially outwardly extending portion received in the said groove and the said axially extending portion received in the said throat in press-fit relationship therewith.

2. The joint of claim 1 wherein the said retaining ring has a radially outwardly projecting shoulder intermediate said radially outwardly directed portion and the said substantially axially extending portion, the said shoulder bottoming against the outside surface of the said housing at the said throat, the said shoulder effective to space the said radially extending portion from the said housing with a portion of said boot seal entrapped therebetween.

3. The joint of claim 2 wherein the said throat opening is frustoconically tapered and the said substantially axially extending portion has a mating taper.

4. The joint of claim 1 wherein spring-like fingers are struck from the said substantially axially extending portion radially outwardly therefrom and are effective to increase the attachment between the retaining ring and the housing.

5. A boot seal and housing assembly comprising an elastomeric member having spaced-apart axial ends and a hollow interior, one of said ends having a relatively large diameter and the other of said ends having a smaller diameter opening, the said member being circumferentially corrugated in a bellows fashion, the said member having a substantially radial groove in its inner periphery, the said groove positioned adjacent the said large diameter end, a substantially rigid retaining ring, said retaining ring having a substantially radially projecting portion received in the said groove, said retaining ring having a substantially axially projecting portion integral with said radially directed portion, the substantially axially extending portion projecting beyond the said large diameter end of the said elastomeric member, said boot seal attached to said joint housing by a press-fit relationship of the axially extending portion of the retaining ring in the housing throat opening so as to hold said relatively large diameter end in sealing engagement with the end surface of said joint housing adjacent said throat opening.